D. B. JAMES.
CARS FOR ONE-RAIL RAILWAYS.

No. 176,864. Patented May 2, 1876.

WITNESSES:
C. Neveux
John Goethals

INVENTOR:
D. B. James
BY
[signature]
ATTORNEYS.

N. PETERS, PHOTO-LITHOGRAPHER, WASHINGTON, D. C.

UNITED STATES PATENT OFFICE.

DAVID B. JAMES, OF VISALIA, CALIFORNIA.

IMPROVEMENT IN CARS FOR ONE-RAIL RAILWAYS.

Specification forming part of Letters Patent No. 176,864, dated May 2, 1876; application filed January 29, 1876.

*To all whom it may concern:*

Be it known that I, DAVID B. JAMES, of Visalia, in the county of Tulare and State of California, have invented a new and Improved Car for Single-Rail Railway, of which the following is a specification:

This invention consists of one line of broad-faced wheels in the center to carry the load, and small guide-wheels to run each side of the rail on vertical axles projecting down from the car, these wheels being to keep the carrying-wheels on the track and to prevent the cars from overturning, for which they will, in practice, be so contrived that they may be made to gripe the rail with more or less force.

The wheels are connected with a platform which is carried only enough higher than the rail to clear it properly, and the car is mounted on pivots arranged in the line of the wheels and supported on the platform, so that the load is balanced on the wheels, and the center of gravity is lowered as much as possible to prevent overturning. The guide-wheels running against the sides of the rails are contrived to move toward and from the rails, and provided with springs to keep them in contact. In the locomotive they may be geared with the power, and have a lever contrivance for griping the rail tightly for traction.

The essential advantage of the contrivance is the economy in the cost of the track that it affords, one rail only being required and that being of wood.

Figure 1:
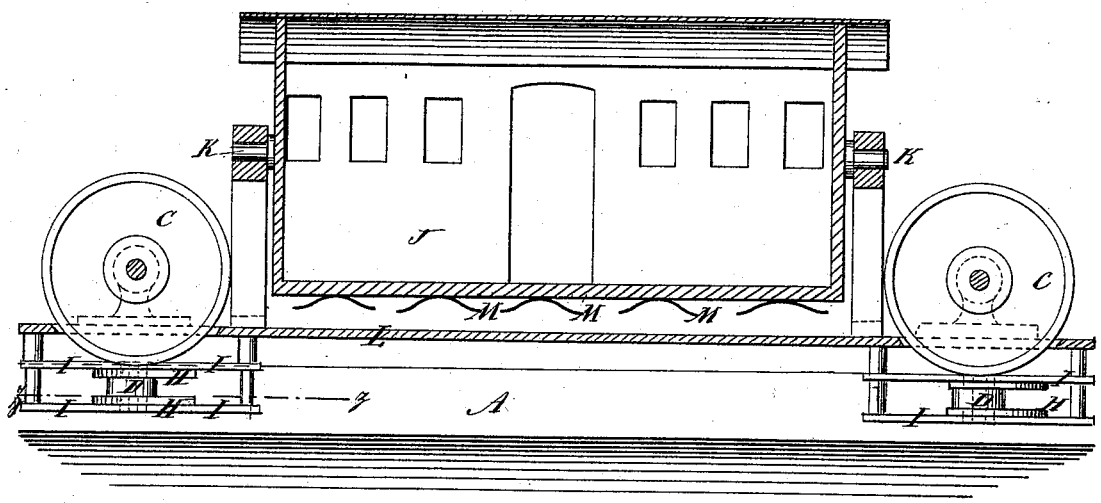
Figure 2:
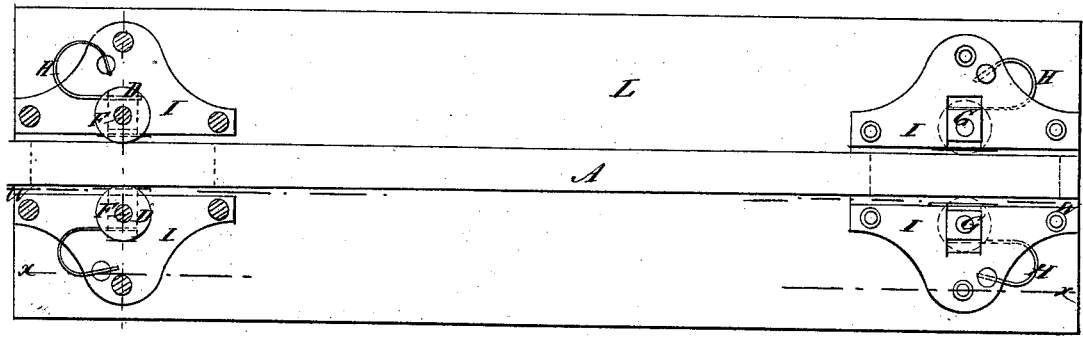
Figure 3:
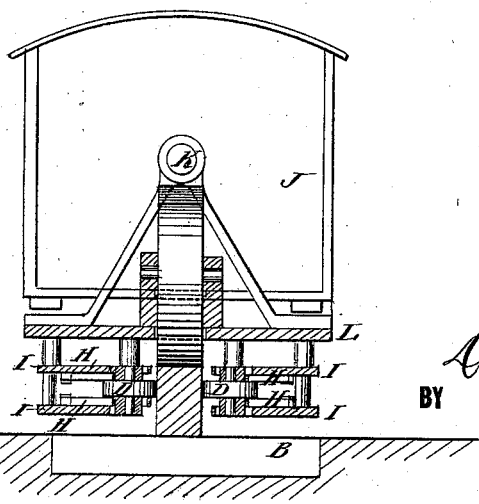

Figure 1 is a longitudinal sectional elevation of my improved railway and car, the section being taken on the lines x x and w w of Fig. 2. Fig. 2 is a horizontal section taken on line z z of Fig. 1, and Fig. 3 is a transverse section taken on line y y of Fig. 2.

Similar letters of reference indicate corresponding parts.

A is the single rail, of wood, which may be of a single timber, or it may be shod on the top with another, to be removed from time to time when worn, the removable one being, say, two or three inches thick. B represents ties, which may be of any suitable kind. C represents the carrying-wheels of the car; D, the wheels for guiding it and preventing it from overturning, the latter wheels being mounted on vertical axles F projecting down from the car body or supports I, so that the wheels run against the edges of the rail while the wheels C run on the top. The axles F are mounted in bearings G, which are movable toward and from the rail, and have springs to press them against the rail, by which they are accommodated to variations in the thickness of the rail, and allow the car to turn curves readily without requiring the wheels C to be mounted on a pivot or fifth wheel.

The car-body J is mounted on the pivots K supported on platform L, which is suspended from the axles of wheels C, the said pivots being arranged in the longitudinal plane of the wheels C so the center of gravity of the load remains more on the wheels than it otherwise would, and the car is more certain of keeping erect in case the load is not trimmed nicely, or the car is jarred or otherwise forced laterally. But to prevent the car from rocking too much on the pivots, and also to prevent it from striking too hard on the platform in case it does rock, buffer-springs M are attached to the under side of the car body so as to strike the platform, or they may be applied to the platform so that the body may strike against them.

The platform will always run level on account of using only one rail and employing the guide-wheels to direct the car, which avoids the necessity of tilting the car as on the curves of the roads of two rails, and thus the difficulty of carrying the cars upright on a single track is greatly diminished.

If desired, the carrying-wheels may be banded with rubber to prevent wear of the wood rails and for running smoothly, but it is believed that the broad surfaces will wear so little as not to need it.

By gearing the guide-wheels of the locomotive with the driving-wheels, and employing levers to cause them to gripe the rails, very steep grades can be ascended.

Having thus described my invention, I claim as new and desire to secure by Letters Patent—

1. The car-body J suspended on pivots K in its longitudinal axis and the pivots mounted on a platform suspended on wheels C, also arranged in the longitudinal axis of the car, substantially as specified.

2. The guide-wheels having lateral movement in combination with the rail A, platform L, and springs H, substantially as specified.

3. The springs M, combined with the car-body J and the platform L, substantially as specified.

4. A single rail railway-car having side wheels working in movable boxes and kept to the curving side of track by springs, as shown and described.

DAVID BICE JAMES.

Witnesses:
 J. E. DENNY,
 PHIL. RIDGEWAY.